Feb. 15, 1966 E. UMBRICHT ET AL 3,235,235
GAS WASHING APPARATUS
Filed Oct. 16, 1961 3 Sheets-Sheet 2
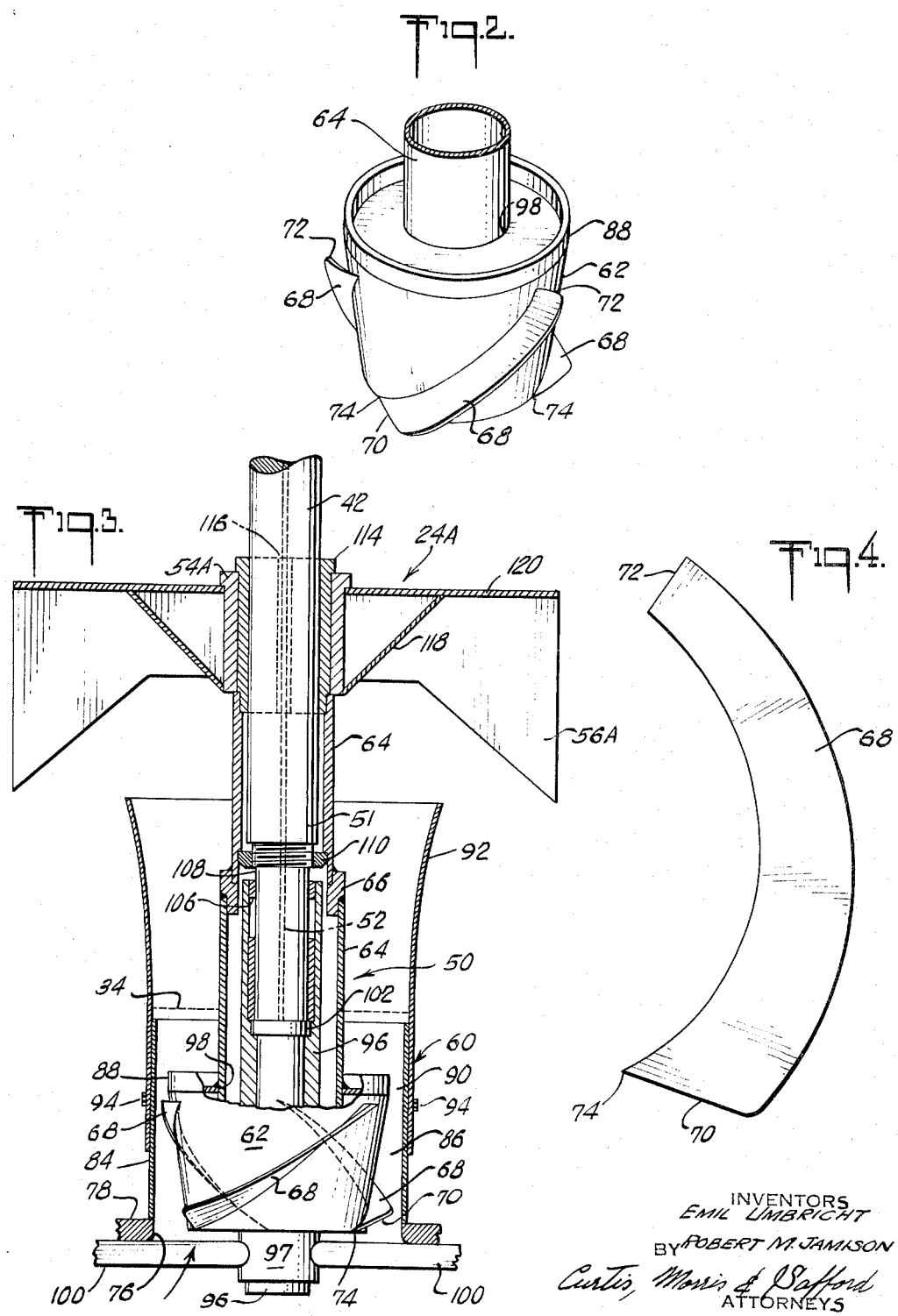
INVENTORS
EMIL UMBRICHT
ROBERT M. JAMISON
BY
Curtis, Morris & Safford
ATTORNEYS Feb. 15, 1966 E. UMBRICHT ET AL 3,235,235
GAS WASHING APPARATUS
Filed Oct. 16, 1961 3 Sheets-Sheet 3

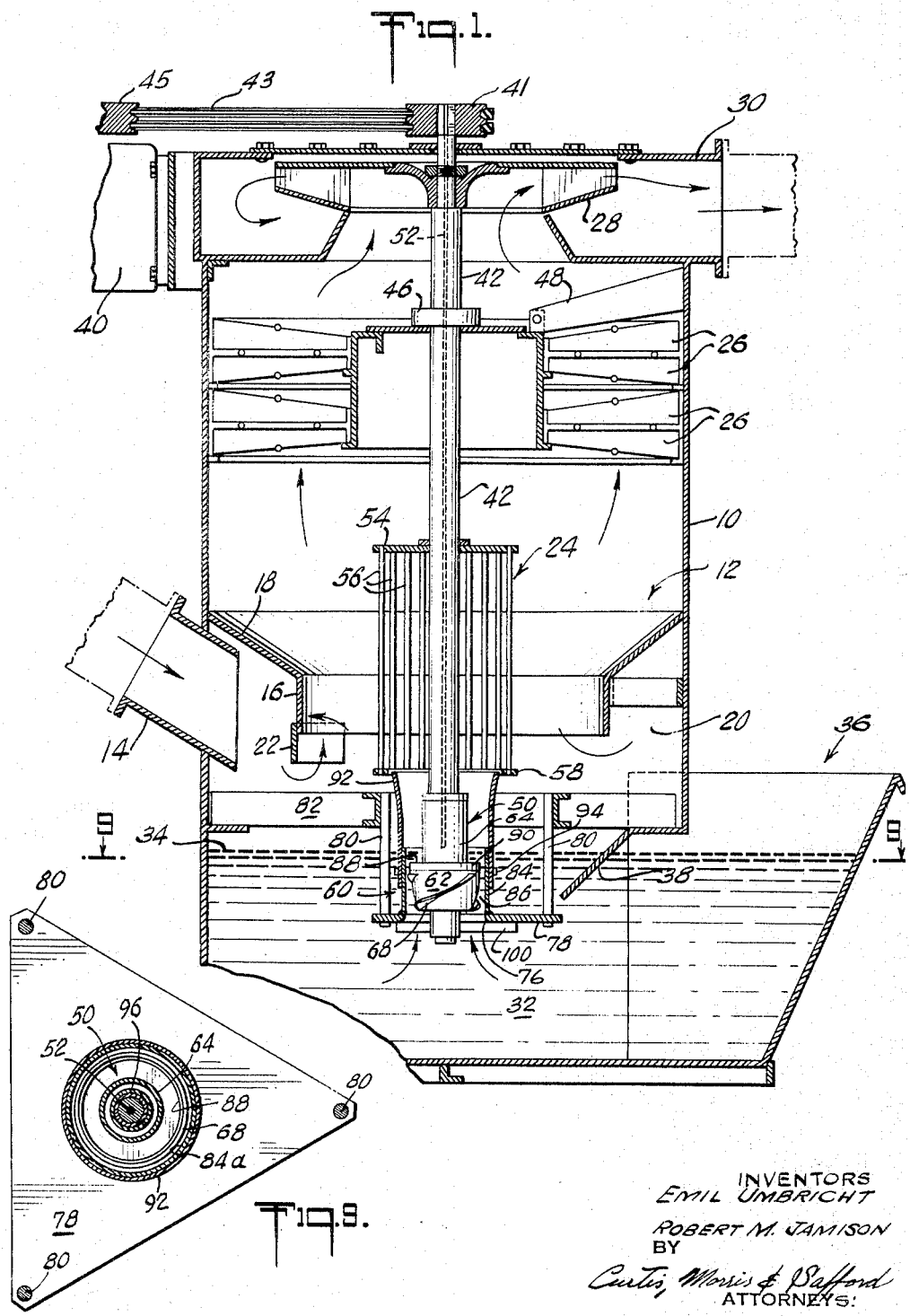

INVENTORS
EMIL UMBRICHT
BY ROBERT M. JAMISON
Curtis, Morris & Safford
ATTORNEYS

United States Patent Office 3,235,235
Patented Feb. 15, 1966

3,235,235
GAS WASHING APPARATUS
Emil Umbricht, Northville, and Robert M. Jamison, Detroit, Mich., assignors to Ajem Laboratories, Inc., Livonia, Mich.
Filed Oct. 16, 1961, Ser. No. 145,509
11 Claims. (Cl. 261—29)

The present invention relates to improved gas washing apparatus and to a liquid impeller adapted to provide a highly effective supply and distribution of washing liquid for producing effective scrubbing of gas.

The present invention is described as embodied in gas washing apparatus adapted for removing entrained matter from industrial gases—gases to be purified for industrial use and gases exhausted from industrial processes which must be freed from contaminants before being discharged into the atmosphere and reaction gases which carry dispersed reaction products which must be recovered from the gases. It is to be understood that the present invention may be utilized to advantage in a wide variety of gas treating processes and apparatus for scrubbing gaseous material with a washing liquid.

In the control of air pollution, for example, many serious problems have arisen with the continued growth of industry. Larger volumes of gases are being utilized or processed in various industrial installations, and in many instances the residual or waste gases are discharged into the atmosphere with contaminating agents entrained therein. Moreover, these contaminating agents are often finely divided and are readily borne into the atmosphere by the discharged gases in spite of treatment by ordinary centrifugal separators, spray type washers, and even electrostatic precipitators. Therefore, an intense, efficient scrubbing action is required to remove the contaminants.

Among the many advantages of the invention disclosed herein are those resulting from the fact that the liquid impeller means supplies large quantities of liquid to the spray-generating mechanism for producing an intense scrubbing action on the gases to be washed. Also, this liquid is uniformly distributed throughout the spray-generating means for providing a deep, dense spray increasing the efficiency of the scrubbing action. Also this impeller means, the spray generator and the air blower can all be on the same drive shaft.

Besides the inventions claimed herein the apparatus shown in the drawings and described above embodies certain inventions claimed in other applications or patents, in common ownership herewith. In particular, the Umbricht Patent No. 2,599,202 and application Serial No. 138,472 filed Sept. 15, 1961 by Robert M. Jamison and Orlan M. Arnold and an application of said Jamison and Nicholas J. Panzica Serial No. 107,710 filed May 4, 1961, now Patent No. 3,170,965, are relevant.

The various features, objects and advantages of the present invention will be in part pointed out and in part apparent from the following detailed description of illustrative examples, of the present invention, in which:

FIGURE 1 is an elevational-sectional view of gas washing apparatus embodying the present invention;

FIGURE 2 is a perspective view of the liquid impeller shown in FIGURE 1;

FIGURE 3 is an elevational-sectional view on an enlarged scale illustrating the impeller and its associated flared liquid-guide tube in cooperative relationship with the lower end of the spray-generating means;

FIGURE 4 is a plan view of one of the impeller blades shown on a further enlarged scale;

Figure 5:
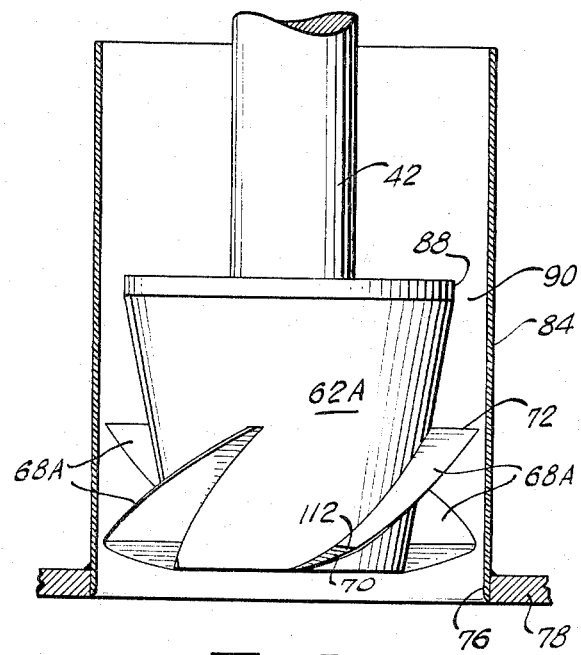
Figure 6:
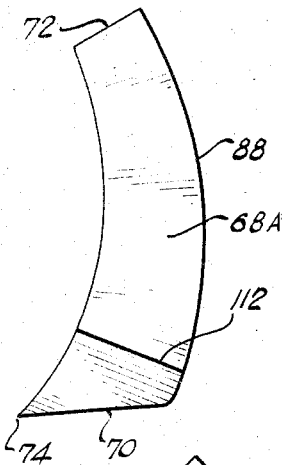
Figure 7:
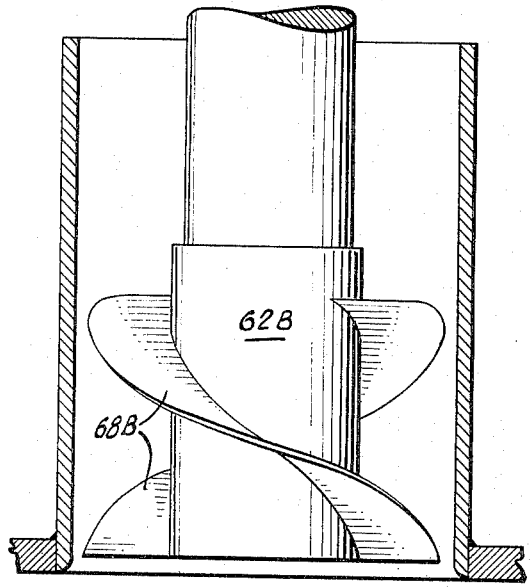
Figures 8, 10:
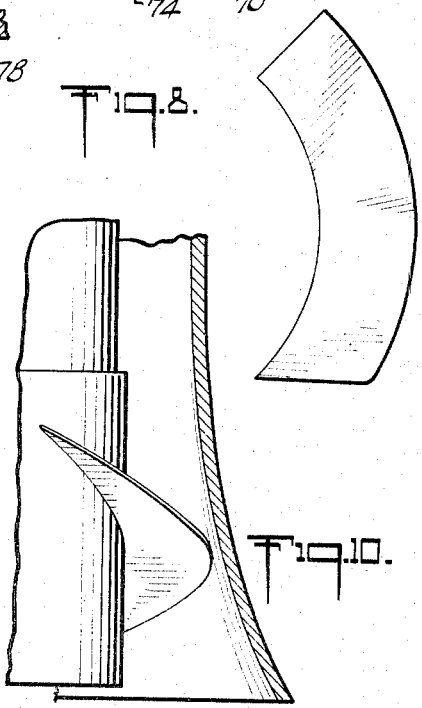

FIGURES 5 and 7 are elevational-sectional views of modified impellers and liquid guide tubes; and FIGURES 6 and 8 are plan views on a somewhat larger scale of blades of the impellers of FIGURES 5 and 7 respectively.

FIGURE 9 is a view in horizontal section, taken on line 9—9 of FIGURE 1, showing the impeller and shroud.

FIGURE 10 is a view of the pump in axial section through the shroud and with its impeller in elevation.

As shown in FIGURE 1, gas washing apparatus embodying the present invention includes a cylindrical upright housing 10 defining therein a gas washing chamber 12. The gas to be washed, for example such as contaminated air, is introduced through an intake duct 14 and is distributed within the housing 10 by means of an annular baffle 16 advantageously having as shown a cylindrical portion connected to the lower end of a conically flared portion 18. Thus, the incoming gas is uniformly distributed throughout an annular intake distributing space 20 between the housing 10 and the baffles 16 and 18. An auxiliary baffle segment 22 near the inner end of the intake duct 14 aids in distributing the incoming gas more uniformly along the annular intake space 20.

This incoming gas rushes inwardly beneath the lower edge of the cylindrical baffle 16 and beneath the baffle segment 22, as indicated by the flow arrows, and then passes upwardly through the annular region within the baffles 16 and 18 and surrounding a centrally located spray-generating rotor 24. As will be described in detail further below, this spray-generator is rotated at a high rate of speed to spatter the liquid into small droplets by impact of the generator elements therewith, and to impart high kinetic energy to them, thus to produce an intense spray of droplets hurled outwardly therefrom. These droplets travel outwardly at high speed through the gas as the gas moves upwardly through the washing chamber 12, and these fast-moving droplets produce the desired scrubbing action and intimate contact in the gas. These liquid droplets remove contaminating agents, including any undesired mist or other dispersed liquid, as well as solid finely divided particles, from the gas being treated, or to produce other desired scrubbing action on the gas while moving through the chamber 12. To assure full benefit of the invention, it is best to use rotational speeds of the order 500–2000 r.p.m. For scrubbing out chemical fumes or very finely divided matter, the higher the speed, the better, up to that at which incipient cavitation begins to appear in the pump. If the speed is too great, the liquid will churn and foam, and efficiency of operation will be lowered.

After the gas has been scrubbed within the chamber 12, it moves upwardly through a plurality of moisture eliminating baffles 26 which define zig-zag paths so as to collect any stray liquid droplets from the gas on the surface of the baffles. The gas is then drawn up into a blower 28 and is discharged through duct 30 at the top of the housing 10.

In order to supply a suitable scrubbing liquid for treating the gas, for example such as water containing wetting agents, rust inhibitors and foam suppressors, etc., or any such agents, the lower end of the housing 10 is shaped to form a liquid reservoir 32, containing liquid up to a level 34. A side access opening 36 is used to introduce the washing liquid and any treating agents which may need to be added to the washing liquid. For preventing outside air from being drawn into the housing 10, a sealing barrier 38 extends down beneath the liquid level.

During operation an electric motor, partially indicated at 40, serves to rotate a central drive shaft 42 which extends vertically along the axis of the housing 10. In order to provide a drive connection between the motor 40 and the shaft 42, the upper end of the drive shaft 42 projects up through a gland in the top of the housing and is fastened to multiple V-belt pulley wheel 41. The motor 40 is coupled by V-belts 43 on the pulley wheels 41 and 45 on the shaft and motor, respectively.

At the lower end of shaft 42 is a pump 60 for feeding liquid to the spray generator 24. Depending upon the type and particular design chosen for this pump, the lower end of shaft 42 and the pump rotor may need to kept accurately coaxial with other parts of the pump, but it is also desirable to have all bearings protected from the liquid being pumped and the gases being scrubbed.

Although we have used several different structures each adapted to accomplish this, we have shown (FIG. 3) one advantageous structure having a bearing at its lower end in a well which protects it from the liquid and provides for lubrication. A portion of the bearing 50 as shown is below the liquid level 34.

To provide for the convenient lubrication of this lower bearing 50, there is an axial lubrication passage 52 which begins at the upper end of the shaft 51 and passes down through the shaft into the interior of the bearing 50.

The spray-generator 24 includes a top disc 54 which is rigidly connected to the shaft 42. A plurality of rod-like elements 56 are rigidly secured to this top disc 54 and depend therefrom with their lower ends being interconnected by a ring 58. The rod-like elements 56 are uniformly spaced about the periphery of the disc 54 so that they define a cage-like structure.

In order to generate an intense spray within the chamber 12, the liquid from the reservoir 32 is impelled by a pump mechanism 60 up through the opening in the ring 58 into the interior of the cage-like spray-generating mechanism 24. This liquid, thrown thus into the path of the revolving cage, is struck by the longitudinal faces of elements 56 and is spattered and hurled outwardly by these elements to form the desired spray. For producing a deep, dense spray extending from the mouth of the pump mechanism through the ring 58 up to the top disc 54, the apparatus of this invention can supply a large quantity of liquid per unit time, and this liquid is uniformly distributed along the full length of the elements 56, starting just above the lower ring 58, which advantageously does not intercept the liquid supply.

The hub 62 is below the liquid level so that the helical vanes 68 act as screws in the liquid when the hub is rotated to drive the liquid upward in the pump 60. By reason of the relatively large diameter of the impeller hub and the circumferential component of drive of the helical blades 68, which effects some rotary flow in the pump and a consequent tendency to vortex formation, a tubular flow is established which, when released at the top of the pump, is carried upward by its own momentum, and somewhat outward, by the vortex effect and by the centrifugal effect of the rotating cage 24 which impels air outward through the cage.

This latter effect can be controlled substantially by adjustment of the opening between the top of the pump 60 and the bottom 58 of the spray generator cage. A little air admitted at this gap can be beneficial in directing the liquid intake along the cage 24, but a greater intake of air will both disturb the desired distribution of liquid in the spray generator and reduce the volume of flow from the pump. Moreover, such gas as enters the cage 24 at this point is not subjected to the full effect of high velocity bombardment with the droplets of scrubbing liquid, but tends merely to flow along with them through the cage 24 and up into the chamber 12.

As shown in FIGURES 1, 2 and 3, the pump mechanism 60 includes a central hub 62 attached to the lower end of the main shaft 42. Three helical blades 68 are secured to this hub. In the case where the hub is in the shape of a truncated cone, these blades are advantageously wider near their leading (lower) ends 70 and gradually taper to a narrower width at their trailing (upper) ends 72. As seen most clearly in FIGURES 2 and 4, the leading ends of these blades are slanted backwardly at a substantial angle, advantageously 20°–60°, from a point 74 at the bottom of the hub 62 with respect to a radius of the hub passing through this point 74. By this expedient it has been found that the blades 68 are enabled to clear themselves from, and to cut through, foreign matter in the liquid such as fibers, threads or string which heretofore has caused serious trouble with impellers in such apparatus by clogging stationary vanes, when used, and wrapping around rotors so as to interfere with their proper action.

As the shaft 42 is rotated at a rapid rate, it turns the blower 28 and the spray generator 24 and also turns the conical hub 62. The liquid in the reservoir 32 as it flows up into the pump 60 around the impeller 62 is engaged by the helical vanes 68 and driven upward as a tubular stream of liquid. The intake opening 76 is smoothly rounded or streamlined to facilitate rapid inflow with little resistance and no channeling.

A mounting 78 for the pump 60 is supported by three spaced vertical posts 80 connected to a frame 82 above the liquid level 34. Surrounding, but spaced radially from, the impeller 62 and its blades 68 is a shroud 84 defining a channel for upward flow of a tubular stream of the liquid. This shroud 84 has an internal surface which is substantially aligned with the pump intake opening 76 and is concentric with the impeller 62.

When the advantageous conical configuration of the hub 62 is used within a surrounding cylindrical portion of the shroud, as shown, a tapered annular throat 86 is formed within the pump. Consequently, as the liquid is driven by the blades 68 up through this tapered annular throat, it is continuously accelerated upwardly. As shown in FIGS. 3 and 7, the pitch of the blades 68 gradually increases upwardly toward their trailing edges 72, so as to give optimum acceleration of the liquid adjusted to the velocity already achieved.

Instead of a conical hub with diameter increasing toward the top and a cylindrical shroud one may use a cylindrical hub and a shroud of decreasing internal diameter, or both may have varying diameter, the significant fact being that the cross-sectional area of the annular channel is constricted in the direction of flow, to produce the acceleration.

With such conical hub or conical shroud, the blades 68 are advantageously tapered to provide a small uniform clearance between their outer edges and the inner surface of the shroud 84.

By way of example, a cylindrical hub provided with three vanes each extending 120° may be 4 3/16" diameter with 1" wide helical blades on its periphery, thus giving 6 3/16" diameter over-all for the impeller rotor. The inside of the shroud then would be about 6 5/16". Such an impeller is suitable for use in a 12,000 cu. ft. per min. air washer. For a 25,000 c.f.m. washer we may use an impeller having a conical hub 7 15/16" diameter at the top of the helical blades and tapered helical blades secured thereto which are 1" wide at the top and 1 5/8" on the bottom of the rotor and operating with 1/16" clearance all around in a shroud. The lower end is cut-off at an angle so that the lead corner is obtuse.

Another 25,000 c.f.m. air washer uses a conical impeller 4" diameter at the bottom and 5 5/8" diameter at the top with 3 helical blades tapered to give uniform clearance of 1/16" from the inner face of the shroud.

A cylindrical impeller 3 5/8" diameter with 4 helical blades secured thereon giving an over-all diameter of 4 7/16" was used to pump aqueous solution into the spray generator of a 4,000 c.f.m. air washer.

It is usually best to use two to four blades with a pitch of 2 to 5 inches in 120°, e.g., with a 3 blade impeller; but with large impellers two to twelve blades may be used.

The pitch of the helix may be varied depending on the volume of liquid to be moved and velocity required, the r.p.m. of the impeller and the size of the space between the hub and the shroud. The pitch can be uniform or can be varied, e.g., as shown in the drawings and described above. If the pitch is too steep the liquid will not be accelerated efficiently and smoothly, as is necessary for best uniform feed into the spray generator, but it will break the column or stream and whip the liquid.

The taper of the blades is designed to keep a more or less constant clearance from the shroud and may be from none to about 15°.

The width of the blades can be reduced relative to other dimensions when it is necessary to reduce the output capacity of the impeller pump.

Advantageously, the pitch of the blades 68 is such as to give mainly a screw action, but the blades have a sufficient axial component to effect circumferential acceleration of the liquid and thus to produce a vortex effect, which aids in maintaining the tubular character of the liquid flow, and in spreading the flow outward at the upper end of shroud 84. The pitch must not be so steep that the blades refuse to lift the liquid by screw action and merely whip or foam the liquid. A lesser pitch with longer blades and higher rotational speed will give the desired acceleration but avoid breaking the column of flow and whipping.

To further direct and guide the liquid supply up into the spray-generating cage 24 and to assure uniform distribution upwardly along the length of the cage elements 56, a short collar 88 may be attached to the top periphery of the central hub to guide recirculating gas into parallel flow before it comes into the liquid stream. Thus, the liquid is driven at high speed up through the narrow annular channel 90 between the guide collar 88 and the shroud 84. Additional guidance and direction of the large volume of liquid supplied by the pump 60 is provided by the flared upper end of shroud 84, and in the embodiment shown in FIGURE 3, by a vertically adjustable flared guide tube 92. The upper end portion flares outwardly to a diameter which is approximately equal to the diameter of the opening in the ring 58 at the lower end of the spray-generating cage 24. Thus, it is possible by upward adjustment of the tube 92, to fit it into the opening in the ring 58, so as to utilize the invention of Robert Jamison and Nicholas Panzica described and claimed in the copending application Serial No. 107,710, filed May 4, 1961.

The flared guide tube 92 is adjusted by sliding it upwardly or downwardly on the shroud 84 and then is secured at the desired level by suitable releasable fastening means, for example, a plurality of set screws 94, fitted through holes in the guide tube or shroud, and nuts welded to the outside thereof in alignment respectively with said holes.

The shroud (including guide tube 92) is thus designed and positioned to produce uniform distribution of the liquid along the length of the elements 56. Adjustment of guide tube 92 provides better control of the pattern of liquid supplied and permits admission of regulated amounts of air at its periphery or restriction of the entry of air.

The bearing 50 serves to support the lower end of the main shaft 42. Various support structures for the bearing have been used. One illustrative structure with special advantages is shown in FIG. 3. A stationary upright column 96 extends upwardly through a central opening 98 in the impeller hub 62 and within the sleeve shaft 64, connected to shaft 42 and to hub 62. The lower end of the column 96 is rigidly secured by a plurality of braces 100 connected to the mounting plate 78. Within the upper end of this column 96 is an elongated socket or well 102 which holds the bearing 50 and an oil seal packing 106. An extension 108 on the lower end of the main shaft 42 extends down through the oil seal 106 and into the bearing 50. The lower end of the lubrication passage 52 runs down through this inner shaft 108 and opens into the well 102. Thus, by feeding lubricant down through the passage 52, it reaches the bearing 50. The seal 106 prevents escape of the lubricant out of the top of the well 102. If the shaft 42 were solid, the passage 52 would be drilled through it from said end to end like a gun bore; if a tubular shaft is used the oil passage 52 can be a small bore tube passing longtiudinally through the hollow shaft.

In the modified impeller shown in FIG. 5, four blades 68A are used, and the conical hub 62A continues upwardly for a substantial distance above the trailing edges 72 of the blades 68A. Thus, there is provided a narrow annular discharge mouth 90, through which the liquid is forced with high acceleration, adjacent to the narrow collar 88. At a point approximately one-quarter of the way back from the leading ends 70, the blades 68A are bent along a line 112 so that the leading ends have a low pitch for initial movement of the liquid and the upper portions of these blades have a steeper pitch for driving the liquid up through the annular discharge mouth 90, with more efficient acceleration. The pitch may increase with many increments instead of just two as shown.

The shroud 84 extends above the collar 88 by an amount greater than the axial length of the part of the impeller having blades 68A. By virtue of this arrangement a high velocity tubular stream is driven up through the shroud 84 and into cage 24; and by virtue of the flared form of the shroud and its relation to the impeller 62 and central opening in ring 58, a more uniform distribution of the liquid up into the spray-generating cage is produced. The flared guide tube 92 may be omitted, but it is found to have advantage for giving more uniform distribution.

The rotary screw action of the impeller and the absence of any fixed vanes or projections into the annular passage between the impeller and the shroud, assures that there will be no "shadows" such as have been observed to impair efficiency in the feed pumps such as were shown in prior patents. By "shadows" is meant areas in which the supply of liquid is diminished because of the obstruction by fixed vanes, supports, etc.

In the apparatus of FIGURES 5 and 7 a solid shaft 42A is used and the lower bearing 50 is omitted. An additional bearing or bearings engaging the shaft 42 above the disc 54 will ordinarily be used in such case to assure perfectly coaxial rotation.

Although we have shown in FIGURE 1 a cage-like spray generator in which a cage of vertical, circularly arranged rods provides the impact surfaces which serve to spatter the liquid feed into droplets and hurl them outward with high velocity, this is illustrative of various structures which can perform this function. In FIGURE 3 is shown a vane type spray generator. Here instead of the cage with rods 56 there is a series of vertical vanes 56A secured to, and angularly spaced about, a hub 54A on the drive shaft 42. A collar 114 welded to (or integrally formed) on shaft 42 is provided with a keyway and drive key 116 and a corresponding keyway is formed on the inside of hub 54A so that the hub and its vanes 56A are driven by the key when shaft 52 is rotated. A Woodruff (arcuate segmental) key is advantageously used which fits into the shaft through the collar 114 and projects sufficiently to engage in the slot 116 in the hub 54A.

As stated above there is advantage in making the impeller 62 in truncated conical form so that it produces acceleration of the liquid by constriction of the area in the annular channel around it. However, good results are attained also with a cylindrical impeller. In FIGURE 7, the blades 68B are of uniform width and the hub of the impeller 62B is cylindrical, as also is the surrounding shroud, but the pitch of the blades increases gradually to produce the increasing velocity of liquid flow in the annular channel due to acceleration of the liquid by action of the impeller.

Upon rotation of shaft 42 at a suitable high speed, as indicated above, the helical vanes 68 of screw impeller 62 drive upward through the shroud 84 a tubular stream of liquid. This stream is driven up through the shroud into the path of rotating vanes 56A, in part directly and in part by a conical deflector 118 so that the stream breaks into coarse drops which are impacted by the longitudinal faces of vanes 56A of the rotor 24A and are broken thereby into a spray of fine droplets and accelerated in an outward direction. A flat annular plate 120 secured to hub 54A by welding to the top edges of vanes 56A, hub 54A and deflectors 118 confines the feed liquid and requires the spray to be thrown outward in a dense narrow band. As shown in FIGURE 3, the vanes 56A are cut back at an acute angle at their lower ends.

The upper portion of sleeve shaft 64 extending between the collar 114 and a nut 110 on shaft 52 is recessed on the inside at opposite ends to receive nut 110 and collar 114. This upper portion and the lower portion of sleeve shaft fit over and into a coupling ring 66 and are welded thereto. Sleeve 64 is also welded to nut 110.

Thus both the spray generator 24A and the impeller pump 60 are driven by the shaft 52 through the collar 114 while the lower end of the shaft enters bearing 50 and holds the rotation of these parts to a precise axis.

Although there is described herein a preferred embodiment of the invention and certain modifications thereof, it is to be understood that these are not exhaustive of the invention; but, on the contrary, are given for purposes of illustration and with a view to explaining the principles of the invention and their application in practical use so that others skilled in the art will be enabled to utilize the invention in a variety of forms and with various modifications, each as may be best suited to the conditions of its particular use.

We claim:

1. In a gas scrubbing apparatus of the type having a scrubbing chamber, an inlet duct for gas to be scrubbed, an outlet duct for scrubbed gas, means for causing the gas to flow into said chamber through the inlet and out of said chamber through the outlet, and means for compelling the flow of gas to pass through an annular space within the scrubbing chamber, the combination therewith of means located centrally of said annular space and adapted for forming an upwardly directed outwardly flared stream of liquid comprising a cylindrical shroud outwardly flared near its top defining an upwardly directed channel for said stream, an outer rotor substantially coaxial with and above said shroud and surrounding said stream, said outer rotor having spaced longitudinal faces which collide with liquid of said stream during rotation spattering it into droplets and throwing outward by centrifugal force the droplets thus formed, means for rotating said rotor at high velocity, an inner rotor within said shroud comprising a hub blocking the center of said channel and defining with said shroud an annular channel for said liquid, screw impeller blades on said hub extending into said channel whereby during rotation of said inner rotor the liquid is propelled upwardly through said annular channel and discharged outwardly from said shroud at high velocity onto said faces of said outer rotor, said screw impeller blades having gradually increasing pitch.

2. A gas scrubbing apparatus as defined in claim 1 wherein said screw impeller blades have sharply increased pitch at a higher part of said hub as compared with that at a lower part thereof.

3. A gas scrubbing apparatus as defined in claim 1 wherein said hub is in the form of a cylinder with said screw impeller blades fitted and secured to its outer face.

4. A gas scrubbing apparatus as defined in claim 1 wherein the leading edges of said screw impeller blades near the bottom are slanted backwardly at an angle in the range of 20° to 60° relative to an adjacent longitudinal edge.

5. A gas scrubbing apparatus as defined in claim 1 wherein the pitch of said screw impeller blades is in the range of 6 to 15 inches per full revolution (and proportional for less than full revolution).

6. A gas scrubbing apparatus as defined in claim 1 wherein the upper end of said hub terminates in an annular collar adapted to guide re-circulating gas into flow substantially parallel to the axis of rotation before it comes into the liquid stream.

7. A gas scrubbing apparatus as defined in claim 1 wherein said hub fills a major part of the cross-sectional area within said shroud and said screw impeller blades extend from said hub almost to the wall of said shroud, but with sufficient clearance to avoid actual contact under operating conditions.

8. In a gas scrubbing apparatus of the type having a scrubbing chamber, an inlet duct for gas to be scrubbed, an outlet duct for scrubbed gas, means for causing the gas to flow into said chamber through the inlet and out of said chamber through the outlet, and means for compelling the flow of gas to pass through an annular space within the scrubbing chamber, the combination therewith of means located centrally of said annular space and adapted for forming an upwardly directed outwardly flared stream of liquid comprising a cylindrical shroud outwardly flared near its top defining an upwardly directed channel for said stream, an outer rotor substantially coaxial with and above said shroud and surrounding said stream, said outer rotor having spaced longitudinal faces which collide with liquid of said stream during rotation spattering it into droplets and throwing outward by centrifugal force the droplets thus formed, means for rotating said rotor at high velocity, an inner rotor within said shroud comprising a hub blocking the center of said channel and defining with said shroud and annular channel for said liquid, screw impeller blades on said hub extending into said channel whereby during rotation of said inner rotor the liquid is propelled upwardly through said annular channel and discharged outwardly from said shroud at high velocity onto said faces of said outer rotor, said hub having the form of an inverted truncated cone and said screw impeller blades having gradually decreasing breadth, whereby their outer edges define a cylinder of slightly less diameter than the inside of said shroud.

9. In a gas scrubbing apparatus of the type having a scrubbing chamber, an inlet duct for gas to be scrubbed, an outlet duct for scrubbed gas, means for causing the gas to flow into said chamber through the inlet and out of said chamber through the outlet, and means for compelling the flow of gas to pass through an annular space within the scrubbing chamber, the combination therewith of means located centrally of said annular space and adapted for forming an upwardly directed outwardly flared stream of liquid comprising a cylindrical shroud outwardly flared near its top defining an upwardly directed channel for said stream, an outer rotor substantially coaxial with and above said shroud and surrounding said stream, said outer rotor having spaced longitudinal faces which collide with liquid of said stream during rotation spattering it into droplets and throwing outward by centrifugal force the droplets thus formed, means for rotating said rotor at high velocity, an inner rotor within said shroud comprising a hub blocking the center of said channel and defining with said shroud an annular channel for said liquid, screw impeller blades on said hub extending into said channel whereby during rotation of said inner rotor the liquid is propelled upwardly through said annular channel and discharged outwardly from said shroud at high velocity onto said faces of said outer rotor, said longitudinal faces being cut back at an acute angle at their lower ends.

10. In a gas scrubbing apparatus of the type having a scrubbing chamber, an inlet duct for gas to be scrubbed, and outlet duct for scrubbed gas, means for causing the gas to flow into said chamber through the inlet and out of said chamber through the outlet, and means for compelling the flow of gas to pass through an annular space within the scrubbing chamber, the combination therewith of means located centrally of said annular space and adapted for forming an upwardly directed outwardly flared stream of liquid comprising a cylindrical shroud outwardly flared near its top defining an upwardly directed channel for said stream, an outer rotor substantially coaxial with and above said shroud and surrounding said stream, said outer rotor having spaced longitudinal faces which collide with liquid of said stream during rotation spattering it into droplets and throwing outward by centrifugal force the droplets thus formed, means for rotating said rotor at high velocity, an inner rotor within said shroud comprising a hub blocking the center of said channel and defining with said shroud an annular channel for said liquid, screw impeller blades on said hub extending into said channel whereby during rotation of said inner rotor the liquid is propelled upwardly through said annular channel and discharged outwardly from said shroud at high velocity onto said faces of said outer rotor, said shroud having a lower portion of substantially uniform diameter, a separate upper flared portion fitted over said lower portion and means permitting longitudinal adjustment of said upper portion on said lower portion, and an annular lower member having a central opening at the lower ends of said longitudinal faces of said outer rotor adjacent said shroud through which said stream passes, whereby said upper shroud portion can be substantially fitted to said central opening in said annular lower member to restrict entry of gases into said outer rotor or spaced therefrom to admit a regulated amount of gas.

11. In a gas scrubbing apparatus of the type having a scrubbing chamber, an inlet duct for gas to be scrubbed, an outlet duct for scrubbed gas, means for causing the gas to flow into said chamber through the inlet and out of said chamber through the outlet, and means for compelling the flow of gas to pass through an annular space within the scrubbing chamber, the combination therewith of means located centrally of said annular space and adapted for forming an upwardly directed outwardly flared stream of liquid comprising a cylindrical shroud outwardly flared near its top defining an upwardly directed channel for said stream, an outer rotor substantially coaxial with and above said shroud and surrounding said stream, said outer rotor having spaced longitudinal faces which collide with liquid of said stream during rotation spattering it into droplets and throwing outward by centrifugal force the droplets thus formed, means for rotating said rotor at high velocity, an inner rotor within said shroud comprising a hub blocking the center of said channel and defining with said shroud an annular channel for said liquid, screw impeller blades on said hub extending into said channel whereby during rotation of said inner rotor the liquid is propelled upwardly through said annular channel and discharged outwardly from said shroud at high velocity onto said faces of said outer rotor, the width of said screw impeller blades being substantially greater at their lower leading edges than at their upper trailing edges and being gradually tapered therebetween.

References Cited by the Examiner

UNITED STATES PATENTS

| | | | |
|---|---|---|---|
| 2,000,720 | 5/1935 | Snyder et al. | 239—221 X |
| 2,176,174 | 10/1939 | Gelakoski | 261—28 |
| 2,282,622 | 5/1942 | Torrence | 261—36 X |
| 2,599,202 | 6/1952 | Schimpke | 61—91 |
| 2,796,241 | 6/1957 | Lhota | 261—91 X |
| 2,833,417 | 5/1958 | Umbricht et al. | 261—3 X |
| 2,949,285 | 8/1960 | Umbricht et al. | 261—3 |
| 2,951,309 | 9/1960 | Briscoe. | |
| 3,011,769 | 12/1961 | Umbricht | 239—221 X |

HARRY B. THORNTON, *Primary Examiner.*

ROBERT A. O'LEARY, *Examiner.*